(12) United States Patent
Hara et al.

(10) Patent No.: US 7,784,593 B2
(45) Date of Patent: Aug. 31, 2010

(54) BICYCLE DISK BRAKE PAD WITH A TITANIUM BACKING PLATE

(75) Inventors: Masaaki Hara, Ikoma-gun (JP); Toru Iwai, Kitakatsuragi-gun (JP); Takashi Fujitani, Sakai (JP); Tsukasa Fukuta, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 573 days.

(21) Appl. No.: 11/278,588

(22) Filed: Apr. 4, 2006

(65) Prior Publication Data

US 2007/0227841 A1 Oct. 4, 2007

(51) Int. Cl.
*F16D 69/00* (2006.01)

(52) U.S. Cl. .............. 188/251 A; 188/250 B; 188/73.1

(58) Field of Classification Search ............. 188/26, 188/250 G, 250 R, 251 A, 251 M, 73.1; 192/107 M
See application file for complete search history.

(56) References Cited

U.S. PATENT DOCUMENTS

| | | | | |
|---|---|---|---|---|
| 3,306,401 A | * | 2/1967 | Dasse | 188/251 M |
| 4,147,241 A | * | 4/1979 | Preniczny et al. | 188/264 G |
| 4,456,578 A | * | 6/1984 | Ward | 419/8 |
| 6,269,669 B1 | * | 8/2001 | Matsubara et al. | 72/53 |
| 2005/0269167 A1 | * | 12/2005 | Iwai et al. | 188/26 |
| 2008/0156600 A1 | * | 7/2008 | Eastham | 188/250 B |

FOREIGN PATENT DOCUMENTS

| | | | |
|---|---|---|---|
| EP | 1605181 A1 | | 12/2005 |
| EP | 1770301 A1 | | 4/2007 |
| GB | 575996 A | | 3/1946 |
| JP | 62007847 A | * | 1/1987 |
| JP | 11-080854 A | | 3/1999 |
| JP | 2000309807 A | * | 11/2000 |

OTHER PUBLICATIONS

Chinese first office action for CN 200710093695.2, the Chinese application that corresponds to this application, dated Sep. 19, 2008.
European search report for EP 07001900.5, the European application that corresponds to this application, dated Nov. 19, 2007.

* cited by examiner

*Primary Examiner*—Robert A Siconolfi
*Assistant Examiner*—Mariano Sy
(74) *Attorney, Agent, or Firm*—James A. Deland

(57) ABSTRACT

A brake pad for a bicycle comprises a backing plate formed from titanium, and a friction member bonded to the backing plate through a diffusion layer. The diffusion layer is formed at least in part by thermal spraying copper onto the backing plate. A method of constructing the brake pad comprises the steps of thermal spraying copper on a backing plate formed from titanium to form a copper layer on the backing plate, and bonding a friction member to the copper layer by forming a diffusion layer with the copper layer.

6 Claims, 9 Drawing Sheets

BICYCLE DISK BRAKE PAD WITH A TITANIUM BACKING PLATE

BACKGROUND OF THE INVENTION

The present invention is directed to bicycles and, more particularly, to a bicycle disk brake pad.

Disk brake pads normally pinch a disk brake rotor that rotates along with the wheel in order to brake the wheel. Resin pads are examples of conventional disk brake pads. Such pads are shown in Japanese Unexamined Patent Application (Kokai) 6-74267, for example. As shown in that reference, resin pads may comprise a backing plate and a friction member attached to the backing plate by an adhesive. The friction member may comprise several powdered elements, sometimes including brass, joined together by a synthetic resin binder. It is also known to form disk brake pads wherein the friction member is formed from sintered materials. For example, a sintered friction member typically used with rotors made from iron, cast iron or stainless steel may comprise a foundation of Cu of Fe powder mixed with Sn, Zn powder, graphite, $MOS_2$, and a hard material such as $SiO_2$ and/or $Al_2O_3$. A sintered friction member typically used with rotors made from titanium or titanium alloy is disclosed in U.S. Pat. No. 5,922,452. That friction member comprises a foundation of titanium or titanium alloy powder, a powder such as Al, Ni, Co, Fe, Mn, Cu, V or Zr for abrasion resistance, a solid lubricant, and a hard material fiber such as mullite. Such a pad improves heat resistance and abrasion resistance relative to sintered pads formed from a foundation of Cu or Fe.

The friction member often is laminated to a metal backing plate made of metal, such as stainless steel, through a coated copper layer. However, the metals forming the backing plate usually are relatively heavy. It would be preferable to use lighter metals such as titanium for the backing plate, but the friction member tends to flay from the backing plate, even when a conventional copper coating is used.

SUMMARY OF THE INVENTION

The present invention is directed to various features of a bicycle disk brake pad. In one embodiment, a brake pad for a bicycle comprises a backing plate formed from titanium, and a friction member bonded to the backing plate through a diffusion layer. The diffusion layer is formed at least in part by thermal spraying copper onto the backing plate. A method of constructing the brake pad comprises the steps of thermal spraying copper on a backing plate formed from titanium to form a copper layer on the backing plate, and bonding a friction member to the copper layer by forming a diffusion layer with the copper layer. Additional inventive features will become apparent from the description below, and such features may be combined with the above features to provide additional benefits.

DETAILED DESCRIPTION OF THE EMBODIMENTS

Figure 1:
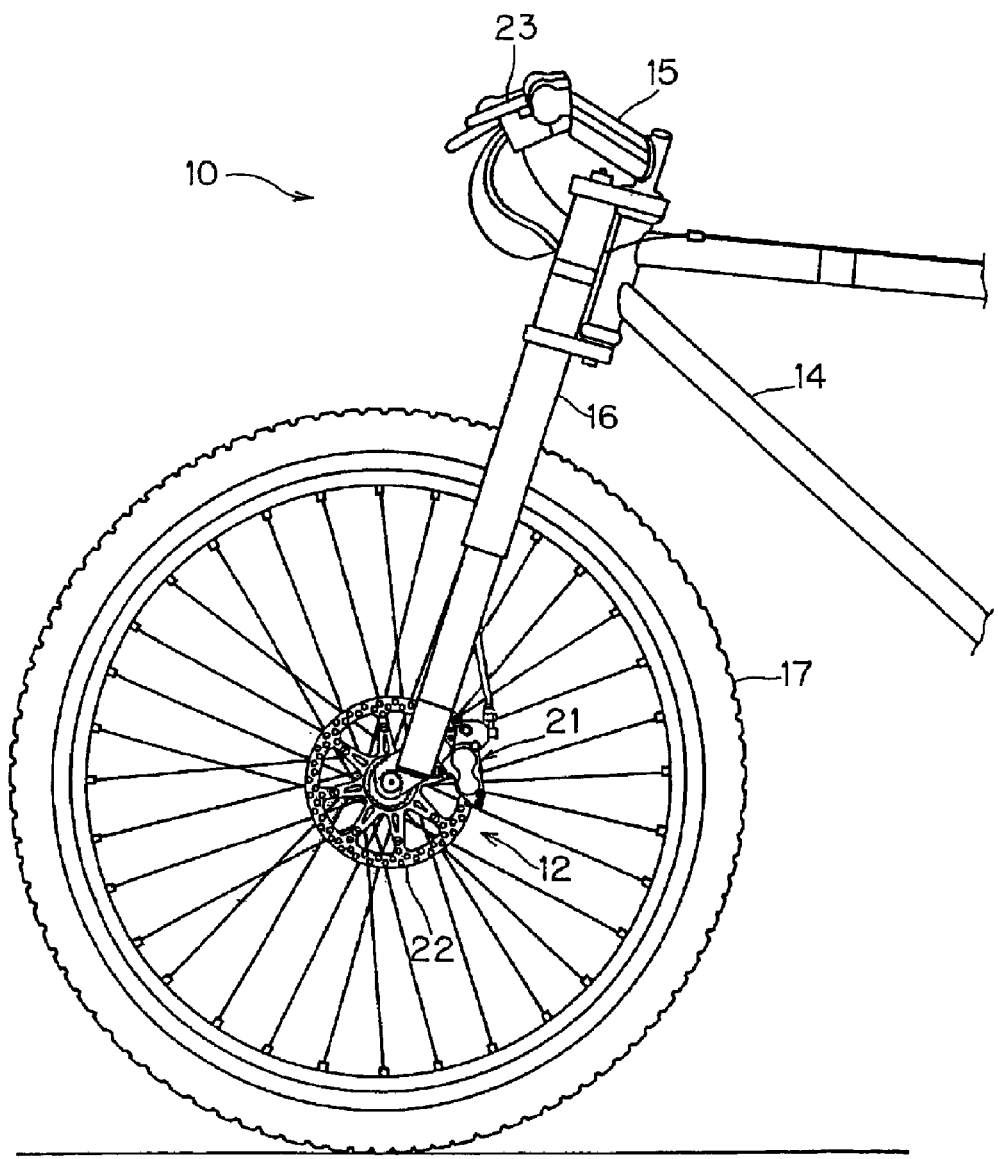
FIG. 1 is a side view of a bicycle with a particular embodiment of a disk brake apparatus.

FIG. 1 is a side view of a bicycle 10 with a particular embodiment of a complete disk brake apparatus 12. Bicycle 10 is a conventional bicycle with a frame 14 supporting a handlebar 15, front and rear forks 16 (only the front fork is shown), front and rear wheels 17 (only the front wheel is shown), and a drive device comprising a sprocket and chain (not shown). Since the structure of such a conventional bicycle is well known in the field, further description if its structure shall be omitted.

Disk brake apparatus 12 comprises a brake caliper 21 mounted on front fork 16, a brake rotor 22 attached to a hub 17a of front wheel 17 so that brake rotor 22 rotates integrally with front wheel 17, and a brake operating mechanism 23. Brake caliper 21 is attached to front fork 16 near brake rotor 22, and it applies a frictional force to brake rotor 22 in response to the operation of brake operating mechanism 23 to stop the rotation of brake rotor 22 and front wheel 17. Brake rotor 22 comprises a centrally disposed hub mounting member 22a attached to hub 17a and a ring-shaped rotor member 22b for contacting brake pads 76.

Figure 2:
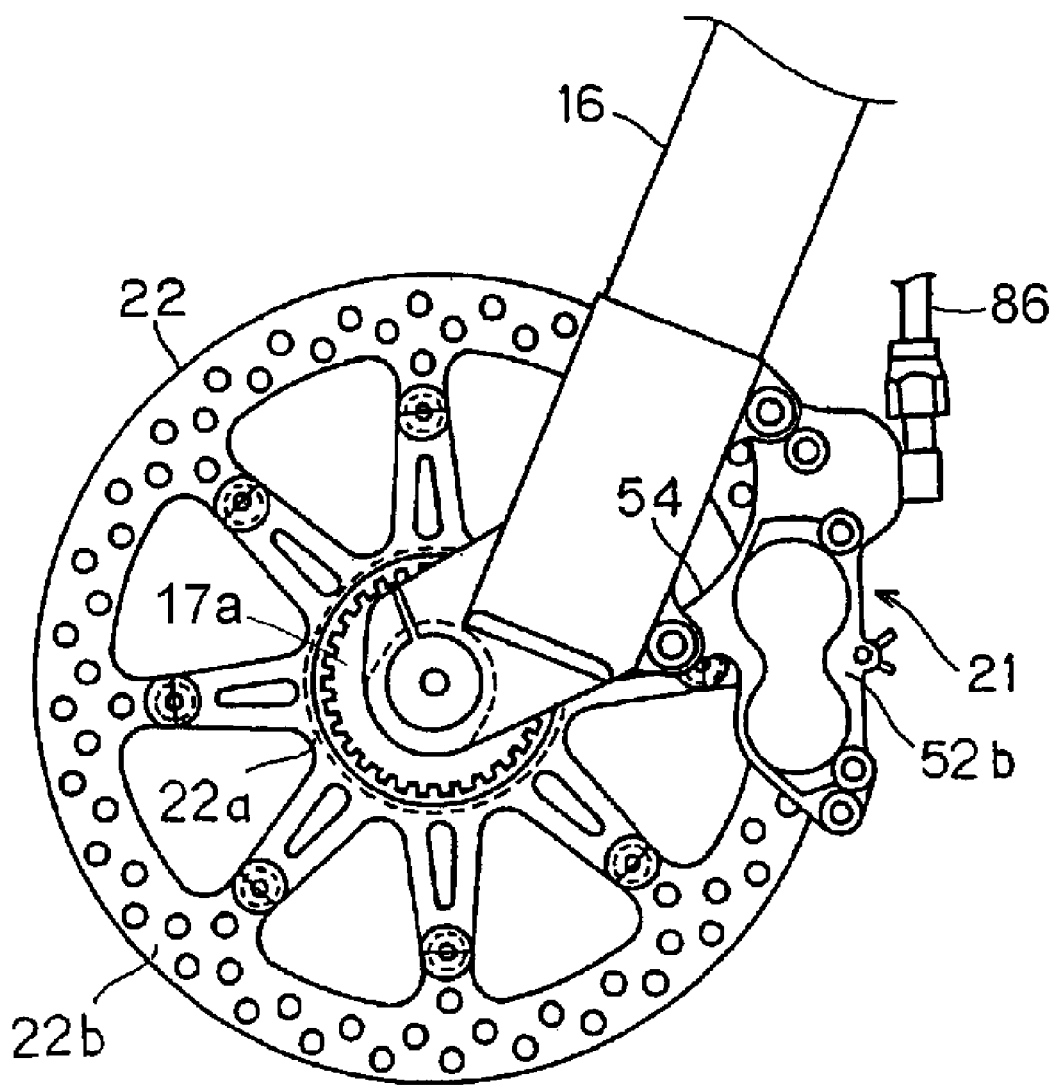
FIG. 2 is a side view of the disk brake apparatus.
Figure 3:
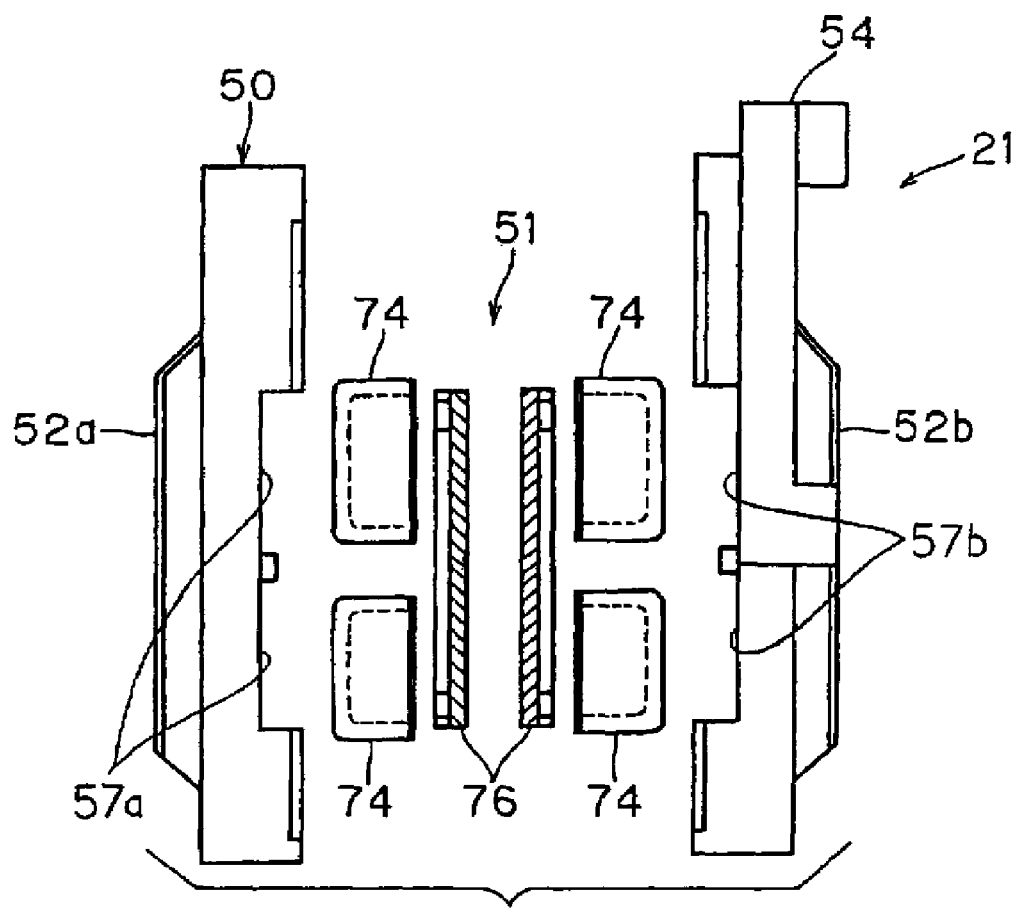
FIG. 3 is an exploded schematic view of the brake caliper assembly.

As shown in FIGS. 2 and 3, brake caliper 21 comprises a housing 50 and a piston unit 51. Housing 50 is constructed of a thermally conducting material such as an aluminum alloy, and it comprises a first housing member 52a and a second housing member 52b bolted together in a conventional manner to form a slot to receive brake rotor 22 therebetween. Housing members 52a and 52b have substantially the same shape, except that hydraulic tubing 86 for brake operating mechanism 23 is connected to second housing member 52b to supply brake oil to both housing members 52a and 52b. Second housing member 52b also has an outwardly extending flange that forms an attachment member 54 for bolting brake caliper 21 to front fork 16.

As shown in FIG. 3, piston unit 51 comprises four pistons 74 and a pair of brake pads 76. Pistons 74 slidably fit into round cylinders 57a and 57b formed in housing members 52a and 52b so as to move between a brake release position and a braking position. Brake pads 76 move integrally with pistons 74. Thus, when pistons 74 move from the brake release position to the braking position, brake pads 76 also move from the brake release position to the braking position. When in the braking position, brake pads 76 press against and apply a frictional force to brake rotor 22 to thereby decrease or stop rotation of brake rotor 22 and front wheel 17. When in the brake release position, the brake pads 76 are spaced apart from brake rotor 22, thus allowing brake rotor 22 and front wheel 17 to freely rotate.

Figure 4:
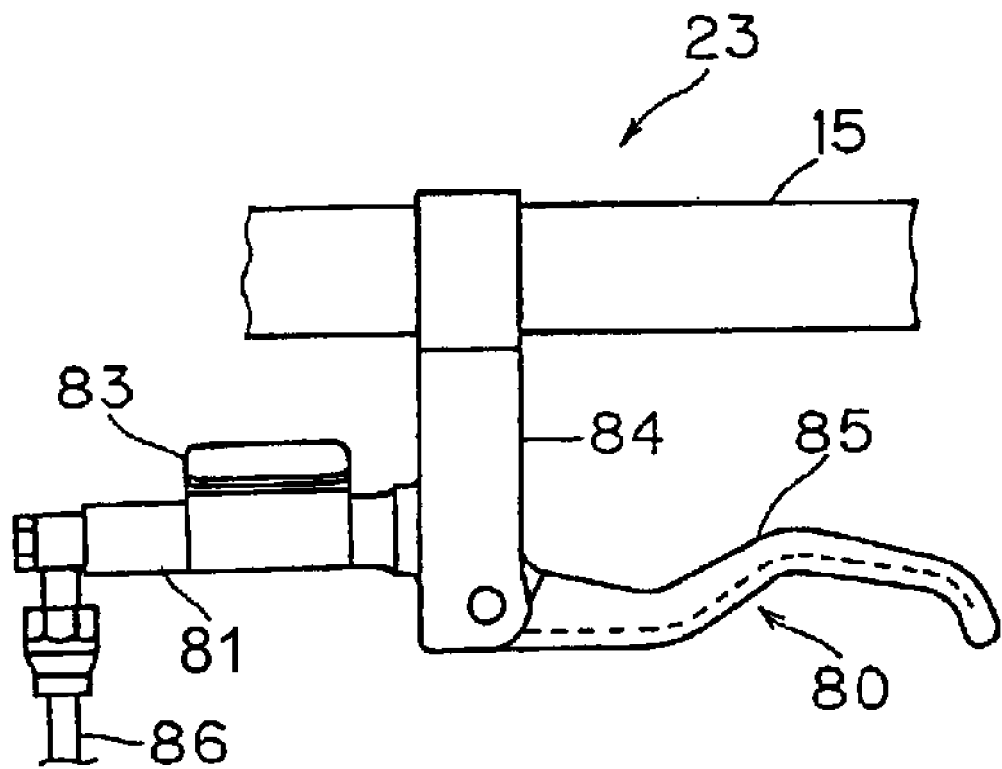
FIG. 4 is a plan view of a particular embodiment of a brake operating device.
Figure 5:
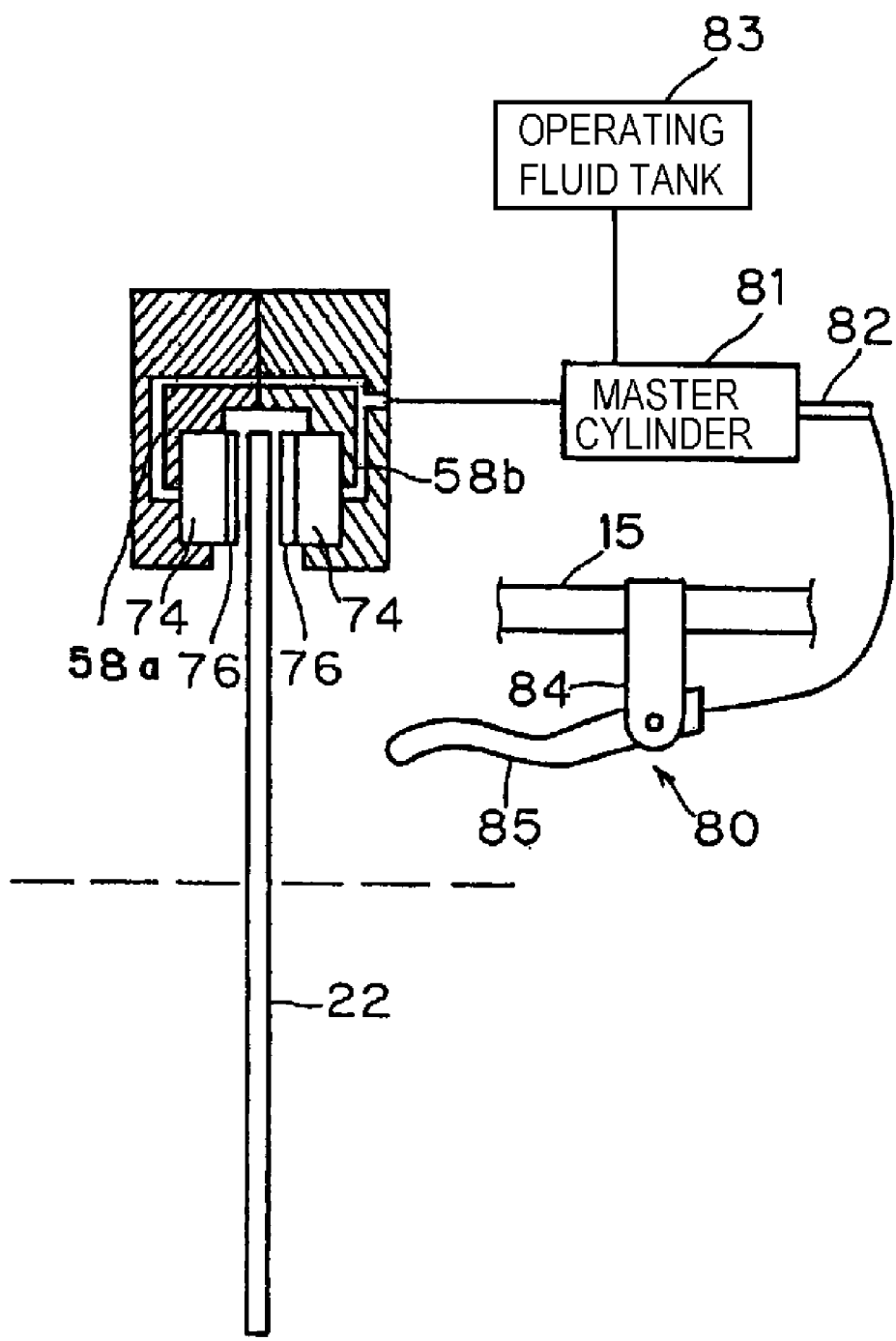
FIG. 5 is a schematic diagram of a particular embodiment of a hydraulic circuit for the disk brake apparatus.

As shown in FIGS. 4 and 5, the brake operating mechanism 23 is attached to handlebar 15. Brake operating mechanism 23 comprises a brake lever assembly 80, a master cylinder 81, a piston 82, and an operating fluid tank 83. Brake lever assembly 80 comprises a bracket 84 mounted on handlebar 15 and a lever component 85 pivotably mounted on bracket 84. Bracket 84 is integrally formed with master cylinder 81, and piston 82 and operating fluid tank 83 are supported by bracket 84. Piston 82 is slidingly disposed within master cylinder 81, and operating fluid tank 83 is in fluid communication with master cylinder 81. One end of piston 82 is connected to lever component 85 so that piston 82 reciprocates inside master cylinder 81 in response to the pulling and releasing of lever component 85. Pulling lever component 85 causes pressurized oil to move through the hydraulic tubing 86 connected to brake caliper 21, the pressurized oil travels through hydraulic passages 58a and 58b and moves pistons 74, brake pads 76 contact and apply frictional force to brake rotor 22, and front wheel 17 is braked.

Figure 6:
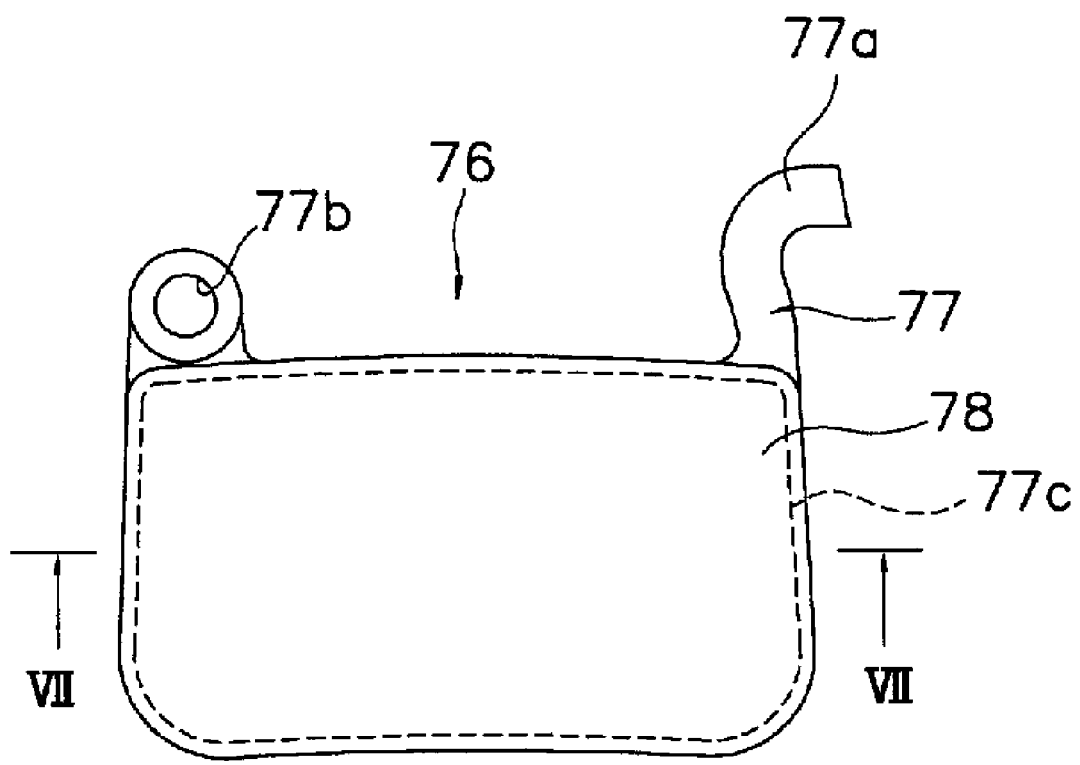
FIG. 6 is a plan view of a particular embodiment of a brake pad.
Figure 7:
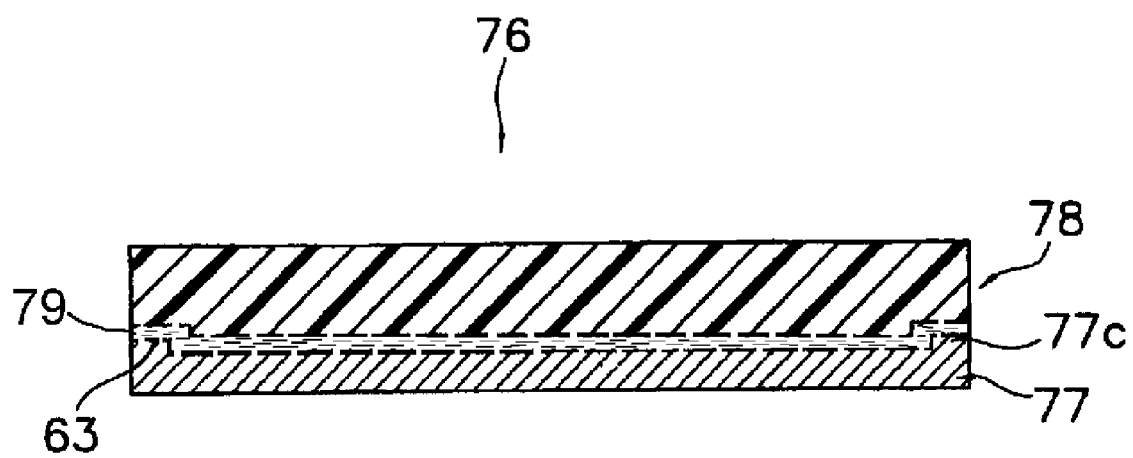
FIG. 7 is a view taken along line VII-VII in FIG. 6.

In this embodiment, brake pads 76 are copper-based pads. As shown in FIGS. 6 and 7, a friction member 78 is mounted (e.g., bonded) to a titanium backing plate 77 by means of a diffusion layer 79 that is formed at least in part by thermal spraying copper onto backing plate 77 during manufacture. Backing plate 77 may comprise a titanium sheet having a thickness in the range of from approximately 1.5 mm to approximately 1.8 mm thick. Backing plate 77 includes a hook-shaped detent 77a and a round support 77b, both of which are slidably supported by first and second housing members 52a and 52b. Backing plate 77 also has convex parts 77c in the form of a continuous protrusion that protrudes toward friction member 78 and extends along the periphery of backing plate 77.

In this embodiment, friction member 78 comprises a metal powder such as Copper, Black lead and more. The surface of friction member 78 comes into contact with disk rotor 22 to brake front wheel 17. Friction member 78 may have a thickness in a range of from approximately 2.0 mm to approximately 2.5 mm. Friction member 78 includes notches 63 in the form of a continuous recess that engages convex parts 77c in backing plate 77 to enhance the coupling between friction member 78 and backing plate 77, thereby further minimizing the possibility that friction member 78 will shear off of backing plate 77.

In this embodiment, friction member 78 is a mixture of the components shown in Table 1.

TABLE 1

| Ingredient | Wt % | Vol. % |
|---|---|---|
| Cu | 60.3 | 37.4 |
| Zn | 7.0 | 5.4 |
| Sn | 2.3 | 1.8 |
| Cr | 7.5 | 5.8 |
| SiO$_2$ | 5.0 | 10.4 |
| Black lead | 12.7 | 32.1 |
| CaF$_2$ | 3.5 | 6.0 |

Figure 8A:
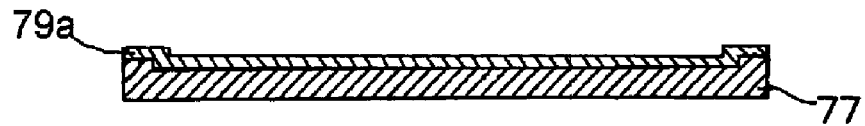
FIGS. 8A-8C show the structure of the brake pad during fabrication.
Figure 8B:
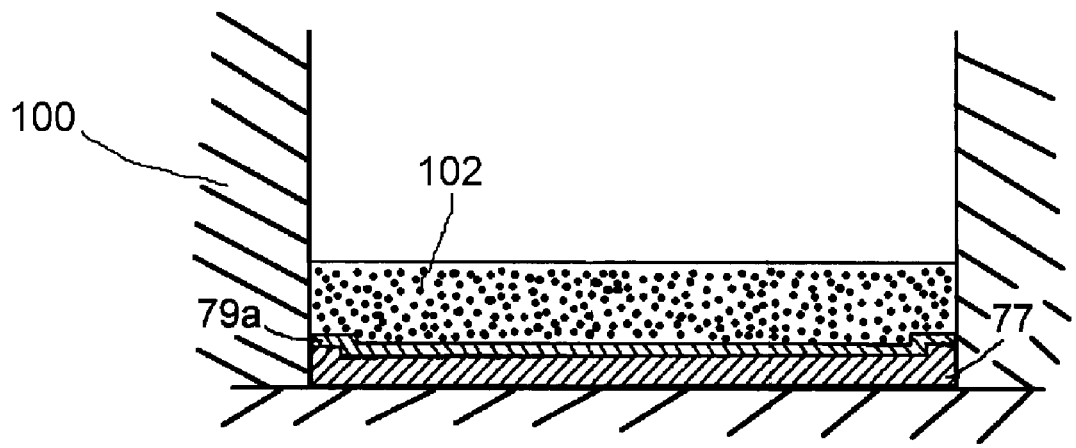
Figure 8C:
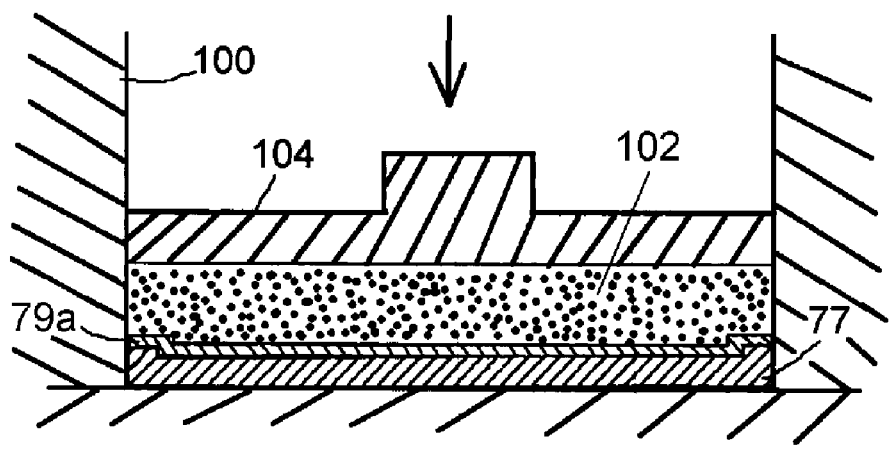
Figure 9:
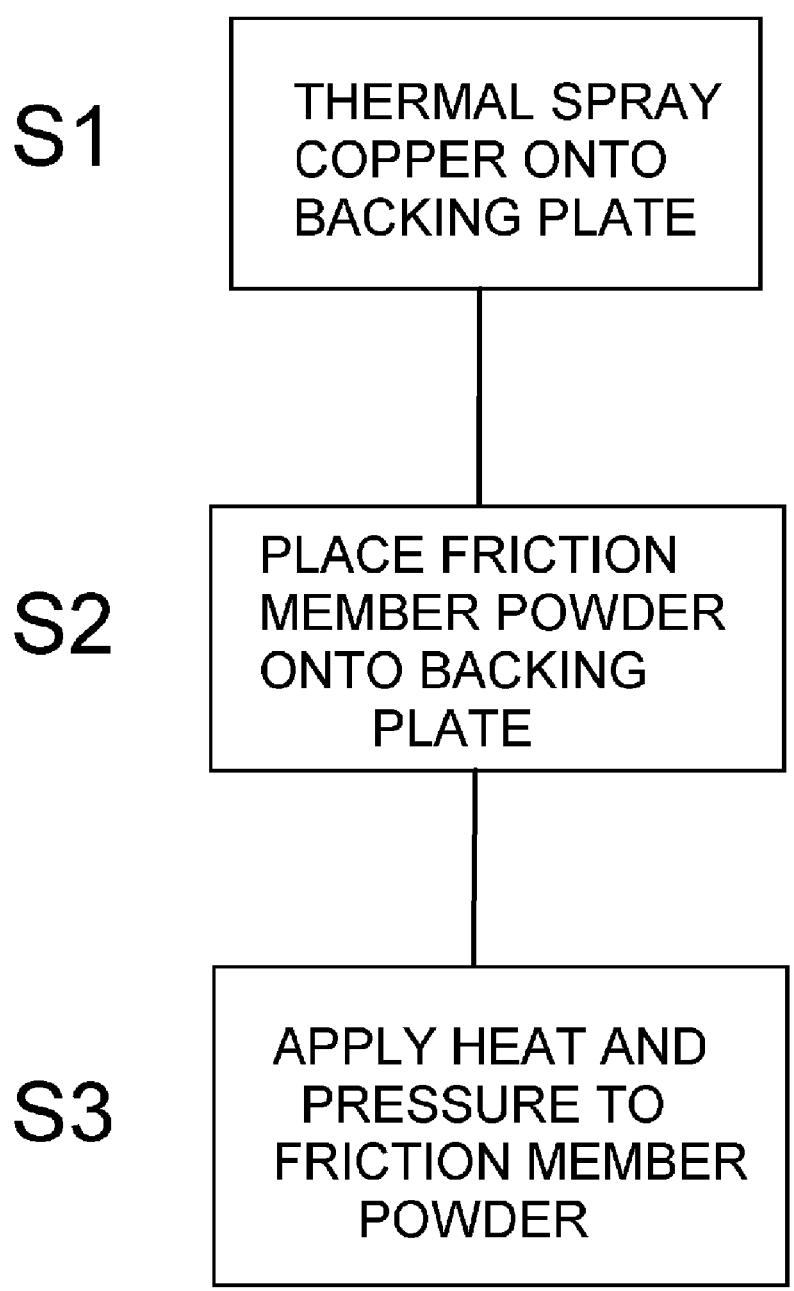
FIG. 9 is a flow chart of a method of constructing the brake pad.

FIGS. 8A-8C show the structure of brake pad 76 during fabrication, and FIG. 9 is a flow chart of a particular embodiment of a method of constructing brake pad 76. In FIG. 8A and step S1 in FIG. 9, copper is thermal sprayed onto backing plate 77 to form a copper layer 79a at a thickness of approximately 15 μm. Thereafter, as shown in FIG. 8B and step S2 in FIG. 9, backing plate 77 (with the thermal sprayed copper layer 79a) is placed in a mold 100, and a powder consolidated tablet 102 such as that shown in Table 1, for example, is placed in mold 100 over copper layer 79a. Finally, as shown in FIG. 8C and step S3 in FIG. 9, pressure is applied to powder consolidated tablet 102 through a pressure applying member 104 in a range of from approximately 2 kg/cm$^2$ to approximately 4 kg/cm$^2$ (e.g., 3 kg/cm$^2$) while simultaneously subjecting powder consolidated tablet 102 to heat in the range of approximately 850° C. to approximately 1000° C. (e.g., 900° C.). This causes sintering of powder-consolidated tablet to form friction member 78. At the same time, titanium and copper diffuse into and/or out from copper layer 79a to form diffusion layer 79, thereby forming a solid bond between backing plate 77 and friction member 78.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A brake pad for a bicycle comprising:
    a backing plate formed from titanium;
    a friction member bonded to the backing plate through a diffusion layer;
    wherein the diffusion layer is formed at least in part by thermal spraying copper onto the backing plate to form a copper layer, by placing a powdered metal on the copper layer and by sintering the powdered metal;
    wherein the sintering includes applying electrical current to the powdered metal and simultaneously applying at least one of pressure or heat to the powdered metal; and
    wherein the powdered metal comprises copper, zinc, tin, chromium, silicon dioxide, black lead, and calcium fluoride.

2. The brake pad according to claim 1 wherein the powdered metal comprises copper with a weight percentage of essentially 60.3%, zinc with a weight percentage of essentially 7.0%, tin with a weight percentage of essentially 2.3%, chromium with a weight percentage of essentially 7.5%, silicon dioxide with a weight percentage of essentially 5.0%, black lead with a weight percentage of essentially 12.7%, and calcium fluoride with a weight percentage of essentially 3.5%.

3. The brake pad according to claim 2 wherein the friction member comprises the sintered powdered metal.

4. The brake pad according to claim 1 wherein the diffusion layer is formed at least in part by thermal spraying copper onto the backing plate to a thickness of approximately 15 μm.

5. The brake pad according to claim 1 wherein the diffusion layer contains copper and titanium caused by diffusion of titanium and copper between the copper layer and the backing plate.

6. The brake pad according to claim 5 wherein the diffusion layer contains titanium that diffused from the backing plate into the copper layer.

* * * * *